US011186200B2

(12) United States Patent
Whitt et al.

(10) Patent No.: US 11,186,200 B2
(45) Date of Patent: Nov. 30, 2021

(54) SYSTEMS AND METHODS FOR BATTERY-DRIVEN PERSONAL MOBILITY VEHICLE MANAGEMENT IN DYNAMIC TRANSPORTATION NETWORKS

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 128 days.

(21) Appl. No.: 16/179,788

(22) Filed: Nov. 2, 2018

(65) Prior Publication Data

US 2019/0375301 A1 Dec. 12, 2019

Related U.S. Application Data

(60) Provisional application No. 62/681,661, filed on Jun. 6, 2018.

(51) Int. Cl.
*G06Q 10/02* (2012.01)
*G06Q 50/30* (2012.01)
(Continued)

(52) U.S. Cl.
CPC .............. *B60L 58/13* (2019.02); *B60Q 1/346* (2013.01); *B60Q 1/444* (2013.01); *B60R 25/245* (2013.01);
(Continued)

(58) Field of Classification Search
CPC ...... B60R 2025/1016; B60R 2325/205; B60R 25/102; B60R 25/245; B60W 2040/0809;
(Continued)

(56) References Cited

U.S. PATENT DOCUMENTS

2003/0177062 A1   9/2003   Chen
2008/0122605 A1   5/2008   Tengler et al.
(Continued)

FOREIGN PATENT DOCUMENTS

CN   104217583 A   12/2014
EP   2 573 720 A1   3/2013
(Continued)

OTHER PUBLICATIONS

Whitt et al., "Systems and Methods for Matching Transportation Requests to Personal Mobility Vehicles", U.S. Appl. No. 16/207,002, filed Nov. 30, 2018, 83 pages.
(Continued)

*Primary Examiner* — Nga X Nguyen
(74) *Attorney, Agent, or Firm* — Baker Botts L.L.P.

(57) ABSTRACT

The disclosed computer-implemented method may include tracking personal mobility vehicle batteries. In some embodiments, the method may track and maintain battery power for personal mobility vehicles to help to ensure that there are personal mobility vehicles with sufficient charge available to perform the needed transportation tasks within a dynamic transportation network. In some examples, a swappable battery for a personal mobility vehicle may communicate with a dynamic transportation management system and provide information about current and/or historical charge information. In some examples, the method may use the current state of charge and/or historical charge information to predict the performance of the battery. Based on the predicted performance, the method may predict the range of a personal mobility vehicles with the battery and/or a lifespan of the battery and make matching decisions accordingly. Various other methods, systems, and computer-readable media are also disclosed.

20 Claims, 12 Drawing Sheets

(51) Int. Cl.
| | |
|---|---|
| *G07C 5/00* | (2006.01) |
| *B60L 58/13* | (2019.01) |
| *B60Q 1/34* | (2006.01) |
| *B60Q 1/44* | (2006.01) |
| *G01C 21/34* | (2006.01) |
| *G06K 9/00* | (2006.01) |
| *B60W 10/08* | (2006.01) |
| *B60W 10/18* | (2012.01) |
| *B60W 10/20* | (2006.01) |
| *B60W 10/30* | (2006.01) |
| *B60W 50/12* | (2012.01) |
| *G08G 1/16* | (2006.01) |
| *G08G 1/01* | (2006.01) |
| *G01C 21/20* | (2006.01) |
| *H04W 4/029* | (2018.01) |
| *H04W 4/40* | (2018.01) |
| *B60R 25/24* | (2013.01) |

(52) U.S. Cl.
CPC ............ *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3423* (2013.01); *G01C 21/3438* (2013.01); *G01C 21/3461* (2013.01); *G01C 21/3492* (2013.01); *G06K 9/00798* (2013.01); *G06Q 10/02* (2013.01); *G06Q 50/30* (2013.01); *G07C 5/004* (2013.01); *G07C 5/008* (2013.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(58) Field of Classification Search
CPC ...... B60W 40/08; B60W 10/08; B60W 10/18; B60W 10/20; B60W 10/30; B60W 50/12; B60W 2552/00; B60W 2552/15; B60W 2300/365; B60W 2510/244; B60W 2710/086; B60W 2710/18; B60W 2710/20; B60W 2710/30; B60W 2720/10; G06Q 10/02; G06Q 30/0645; G06Q 50/30; H04W 12/06; H04W 12/08; H04W 4/40; H04W 4/02; H04W 4/024; H04W 4/029; B60L 58/13; B60Q 1/346; B60Q 1/444; G01C 21/3423; G01C 21/3415; G01C 21/3461; G01C 21/3438; G01C 21/3492; G01C 21/20; G07C 5/004; G07C 5/008; B62K 2202/00; G08G 1/163; G08G 1/165; G08G 1/0125; G08G 1/205; G08G 1/0141; G06K 9/00798; G06K 9/00791

See application file for complete search history.

(56) References Cited

U.S. PATENT DOCUMENTS

| | | |
|---|---|---|
| 2011/0133918 A1 | 6/2011 | Lee et al. |
| 2012/0143401 A1 | 6/2012 | Jayadevappa et al. |
| 2013/0046456 A1 | 2/2013 | Scofield et al. |
| 2013/0173146 A1 | 7/2013 | Atmur et al. |
| 2015/0074004 A1 | 3/2015 | Song |
| 2015/0092056 A1 | 4/2015 | Rau et al. |
| 2015/0305426 A1 | 10/2015 | Lee et al. |
| 2016/0069696 A1 | 3/2016 | Salowitz |
| 2016/0131492 A1 | 5/2016 | Sheha et al. |
| 2016/0306350 A1 | 10/2016 | Shim et al. |
| 2017/0030728 A1 | 2/2017 | Baglino et al. |
| 2017/0146354 A1* | 5/2017 | Boss ................... G07C 5/0866 |
| 2017/0191845 A1 | 7/2017 | Marueli et al. |
| 2017/0236415 A1 | 8/2017 | Okabe et al. |
| 2017/0243492 A1 | 8/2017 | Lambert et al. |
| 2017/0364995 A1* | 12/2017 | Yan ........................ B60L 53/665 |
| 2018/0018840 A1* | 1/2018 | Xia .......................... G07C 9/29 |
| 2018/0096445 A1 | 4/2018 | Eyler et al. |
| 2018/0114258 A1 | 4/2018 | Ross et al. |

FOREIGN PATENT DOCUMENTS

| | | |
|---|---|---|
| EP | 3 188 141 A1 | 7/2017 |
| JP | 2008-037167 A | 2/2008 |
| JP | 2015-060452 A | 3/2015 |
| KR | 97-69562 A | 11/1997 |
| KR | 10-2012-0092361 A | 8/2012 |
| WO | 2017/194416 A1 | 11/2017 |
| WO | 2018/079590 A1 | 5/2018 |

OTHER PUBLICATIONS

Whitt et al., "Systems and Methods for Determining Allocation of Personal Mobility Vehicles", U.S. Appl. No. 16/175,723, filed Oct. 30, 2018, 69 pages.

Whitt et al., "Systems and Methods for Routing Personal Mobility Vehicles Based on Road Conditions", U.S. Appl. No. 16/235,699, filed Dec. 28, 2018, 66 pages.

Whitt et al., "Apparatuses, Systems, and Methods for Increasing Safety in Personal Mobility Vehicle Operation", U.S. Appl. No. 16/181,325, filed Nov. 5, 2018, 81 pages.

Whitt et al., "Systems and Methods for Transport Completion Using Lane-Constrained Vehicles and Personal Mobility Vehicles", U.S. Appl. No. 16/206,999, filed Nov. 30, 2018, 99 pages.

Whitt et al., "Systems and Methods for Automated Signaling for Networked Personal Mobility Vehicles", U.S. Appl. No. 16/235,707, filed Dec. 28, 2018, 58 pages.

\* cited by examiner

SYSTEMS AND METHODS FOR BATTERY-DRIVEN PERSONAL MOBILITY VEHICLE MANAGEMENT IN DYNAMIC TRANSPORTATION NETWORKS

CROSS REFERENCE TO RELATED APPLICATION

This application claims the benefit of U.S. Provisional Application No. 62/681,661, filed 6 Jun. 2018, the disclosure of which is incorporated, in its entirety, by this reference.

BACKGROUND

Personal mobility vehicles such as scooters and bicycles are a popular way to escape traffic-clogged streets and inconveniently timed public transportation while still reaching the destination more quickly than can be accomplished by walking. Personal mobility vehicles that are wholly or partially electrically powered, such as electric scooters and bicycles, may be even more convenient than traditional manually powered versions.

However, the function of an electrical personal mobility vehicle is at least partially dependent on the state of the battery. A personal mobility vehicle with a battery that runs out of charge partway through a trip may strand the rider in an inconvenient situation. Accordingly, the instant disclosure identifies and addresses a need for additional and improved systems and methods for tracking personal mobility vehicle batteries.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
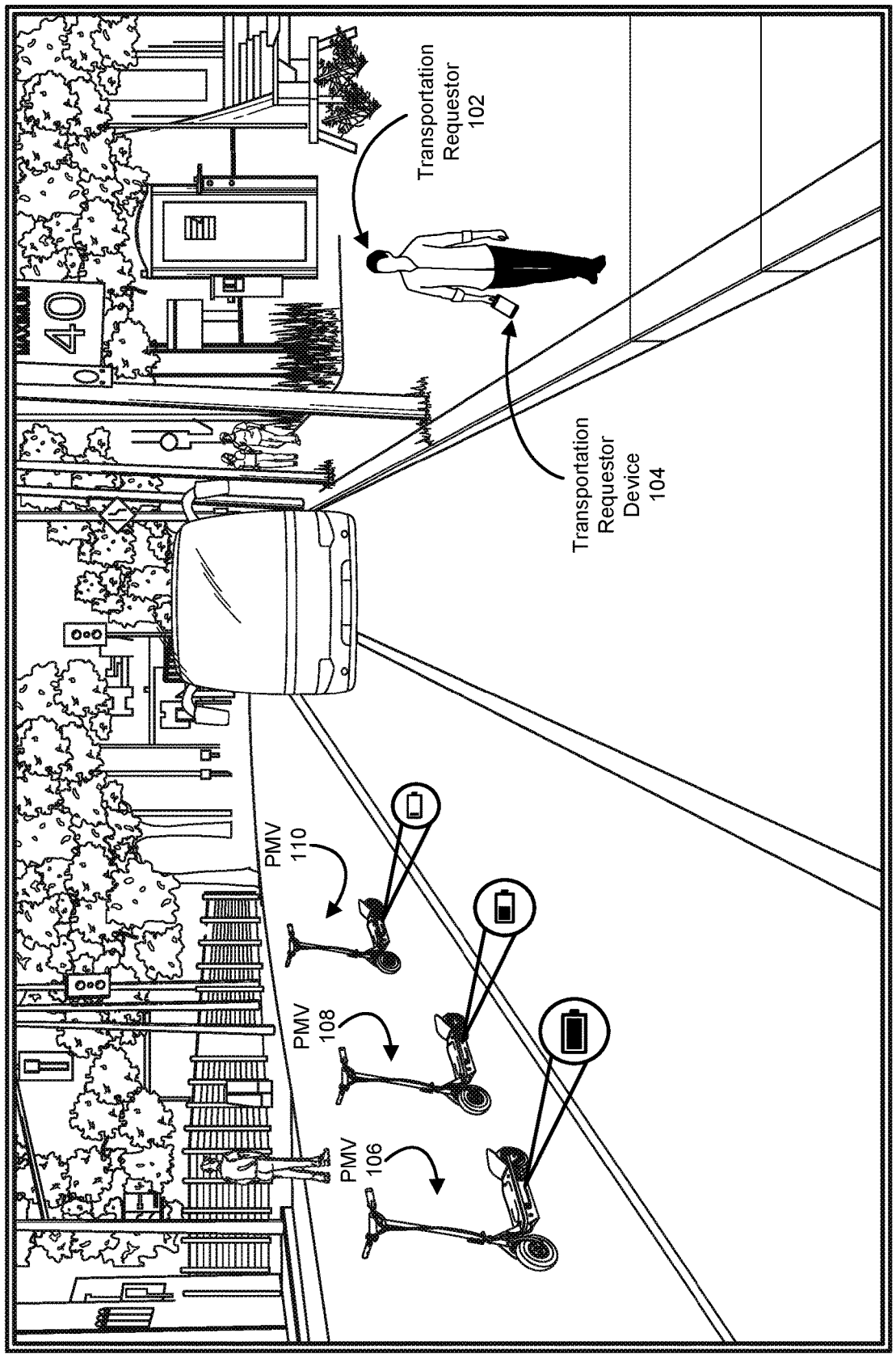
FIG. 1 is an illustration of an example set of personal mobility vehicles with varying battery statuses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to tracking personal mobility vehicle batteries by receiving information about the state of each battery disposed within a personal mobility vehicle within the dynamic transportation network and storing the battery information on a per-battery basis to enable tracking and accurate predictions of battery performance even when batteries are swapped between personal mobility vehicles (PMVs). In some examples, the systems described herein may track battery information for PMVs to help to ensure that there are PMVs with sufficient charge available to perform the needed transportation tasks within a dynamic transportation network. By tracking battery state information on a per-battery basis across the transportation network (e.g., even as the battery is swapped out of one PMV, charged, and swapped into another PMV), the systems described herein may aid with battery maintenance as well as matching and/or routing decisions involving PMVs. By making decisions based on historical battery usage and/or performance as well as current battery status, the systems described herein may improve the efficiency of a dynamic transportation network as well as the user experience of transportation requestors transported by the dynamic transportation network by reducing the likelihood that a transportation requestor will be stranded by a dead PMV battery in the middle of a trip. Additionally, the systems described herein may improve the lifespan of batteries by taking battery history into account when planning future usage of the battery and/or performing maintenance.

Accordingly, as may be appreciated, the systems and methods described herein may improve the functioning of a computer that facilitates transportation via PMVs. For example, the systems described herein may improve the efficiency and/or output of a dynamic transportation matching algorithm deployed on a computing device that matches transportation requestors with PMVs. Furthermore, for the reasons mentioned above and to be discussed in greater detail below, the systems and methods described herein may provide advantages to dynamic transportation management and/or the field of transportation by improving the lifespan of batteries deployed within a dynamic transportation network and reducing the occurrence of transportation requestors being stranded mid-trip due to dead batteries.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include road-going vehicles (e.g., cars, light trucks, etc.). Furthermore, the dynamic transportation network may include PMVs. In some embodiments, a dynamic transportation network may include autonomous vehicles (e.g., self-driving cars) that may be capable of operating with little or no input from a human operator.

FIG. 1 illustrates an example set of PMVs with varying battery statuses. As illustrated in FIG. 1, a transportation requestor 102 may request, via a transportation requestor device 104, transportation from a dynamic transportation network manage by a dynamic transportation matching system. In some examples, the dynamic transportation matching system may determine that a PMV is the most efficient and/or effective means of fulfilling the transportation request from transportation requestor device 104. In one example, PMV 106, PMV 108, and/or PMV 110 may all be equally close and/or convenient to transportation requestor device 104. If the dynamic transportation matching system has no information about the state of the batteries within PMVs 106, 108, and/or 110, the dynamic transportation matching system may match transportation requestor device 104 with a PMV that has insufficient charge to fulfill the transportation request (e.g., PMV 110) even if another PMV with sufficient charge (e.g., PMV 106) is available. In some examples, the transportation request from transportation requestor device 104 may be fulfillable by a PMV with an incompletely charged battery (e.g., PMV 108) and it may be more efficient to match transportation requestor device 104 with the partially charged PMV and reserve the fully charged PMV for a transportation request that may be expected to consume more battery charge. In some examples, one PMV may have a battery that has experienced a high number of charging cycles while another PMV may have a battery that has experienced comparatively few charging cycles and matching transportation requestor device 104 with the PMV with the less-used battery may prolong the lifespan of the other battery. In order to make any of these determinations about the most efficient PMV with which to match transportation requestor device 104, the dynamic transportation matching system may use information about the current state and/or history of the batteries disposed within the PMVs.

Figure 2:
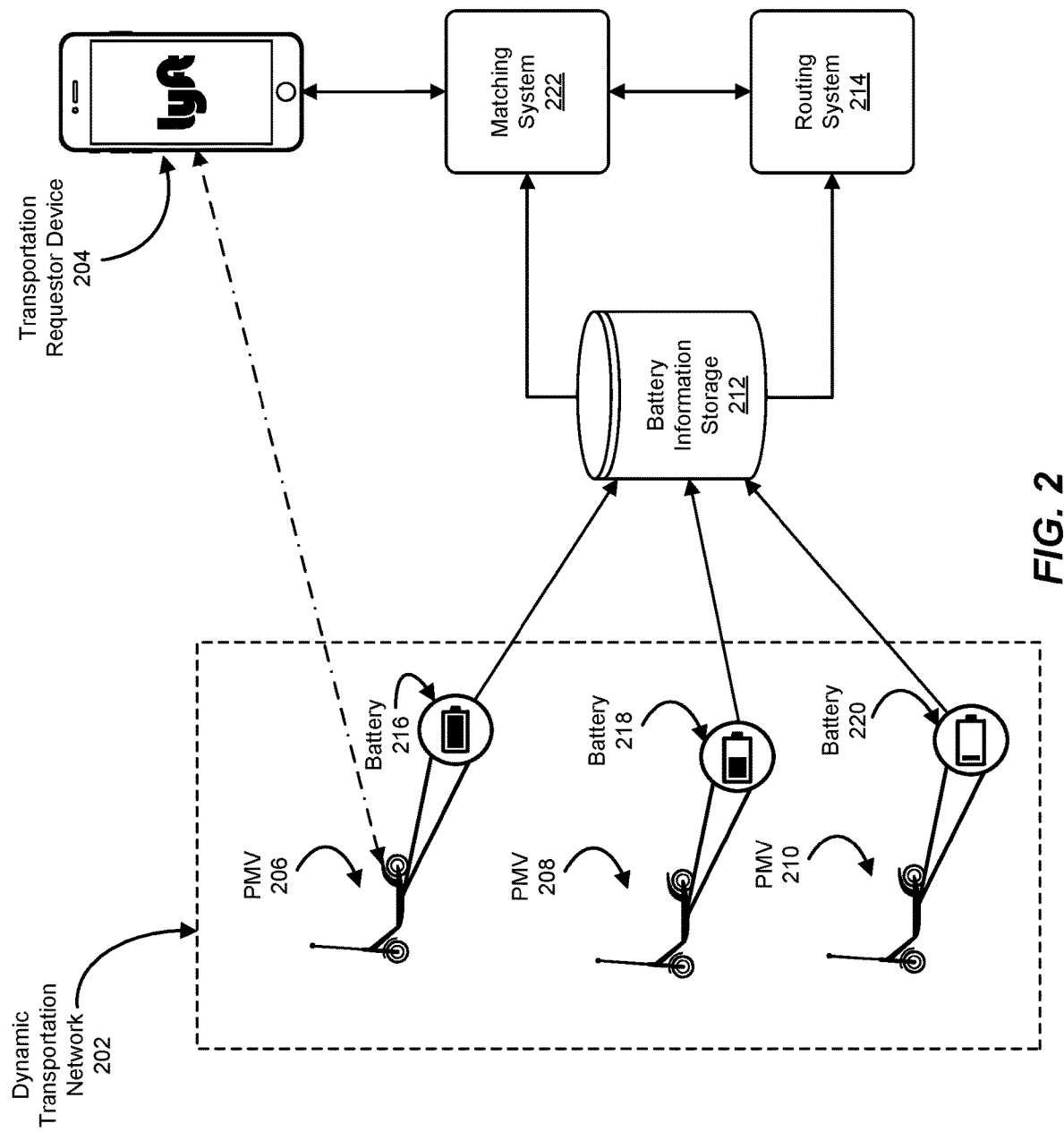
FIG. 2 is an illustration of an example architecture for tracking personal mobility vehicle batteries.

FIG. 2 illustrates an example architecture for tracking PMV batteries. In some embodiments, a dynamic transportation network 202 may include multiple PMVs, such as PMVs 206, 208, and/or 210. In one example, PMV 206 may be equipped with a battery 216, PMV 208 may be equipped with a battery 218, and/or PMV 210 may be equipped with a battery 220. In some embodiments, each PMV and/or battery may send battery information to battery information storage 212. In one embodiment, battery information storage 212 may communicate with a matching system 222 and/or a routing system 214 in order to enable the dynamic transportation matching system to make efficient matching and/or routing decisions that take battery data into account. In one example, matching system 222 may match a transportation requestor device 204 with PMV 206 based at least in part on information about battery 216. For example, battery 216 may have sufficient charge to fulfill a transportation request received from transportation requestor device 204, may not currently need maintenance, and/or may have experienced fewer charging cycles than batteries disposed in other available PMVs.

Figure 3:
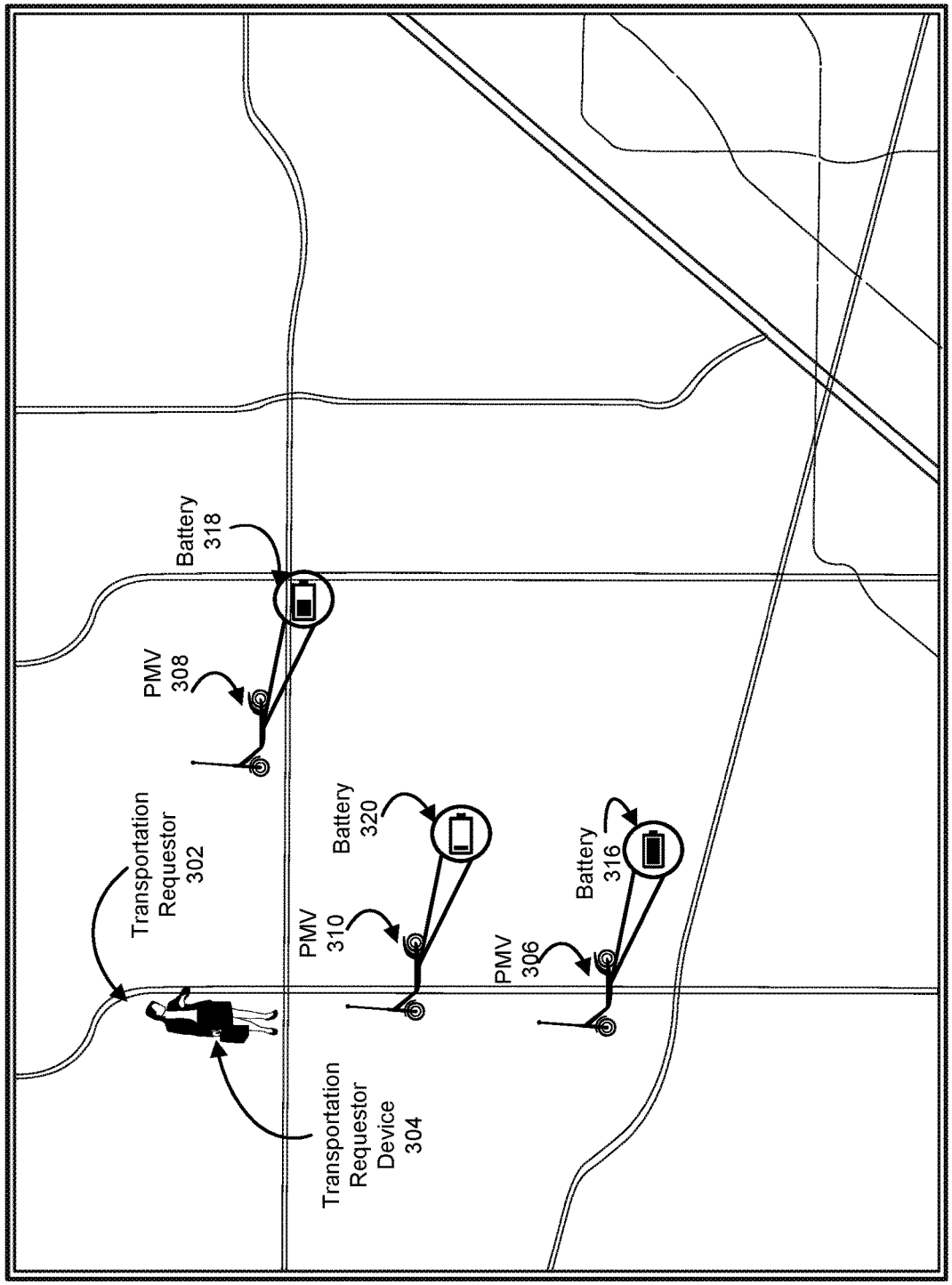
FIG. 3 is an illustration of an example map with a set of personal mobility vehicles with varying battery statuses and locations.

FIG. 3 illustrates an example map with a set of PMVs with varying battery statuses and locations. As illustrated in FIG. 3, a transportation requestor 302 with a transportation requestor device 304 may be located different distances from a variety of PMVs with different battery states. For example, a PMV 310 with a battery 320 may be the closest PMV to transportation requestor 302, a PMV 308 with a battery 318 may be the next-closest, and a PMV 306 with a battery 316 may be further away than PMV 308. In one example, a naïve approach of matching transportation requestor device 304 with the closest PMV, PMV 310, may result in transportation requestor 302 becoming stranded when battery 320 quickly runs out of charge. An equally simplistic approach of matching transportation requestor device 304 with the PMV with the highest charge, PMV 306, may result in transportation requestor 302 walking extra distance when PMV 308 is closer and battery 318 has sufficient charge to fulfill the transportation request. Therefore, in some examples, the systems described herein may balance trip length, battery state, and/or PMV location when matching a transportation requestor device with a PMV.

In one embodiment, the systems described herein may determine that battery 320 has sufficient charge to fulfill the transportation request and may match transportation requestor 302 with PMV 310 in order to conserve PMVs with more fully charged batteries for transportation requests that require more battery charge to fulfill. In some examples, the systems described herein may match a transportation requestor and/or transportation requestor device with a PMV based on determining a battery charge needed to reliably make a trip associated with a transportation request sent by the transportation requestor device, determining that the PMV has (or will have at the time of the trip) at least the needed battery charge, and determining that one or more other candidate PMVs have more battery charge than the PMV (and, therefore, more than is needed to reliably make the trip), thereby preserving the other candidate PMVs for other requests that may be associated with a need for a greater battery charge level. In some examples, the systems described herein preferentially match transportation requestors with shorter trips with PMVs with less charged batteries while also matching based on other factors (e.g., distance to PMV).

Figure 4:
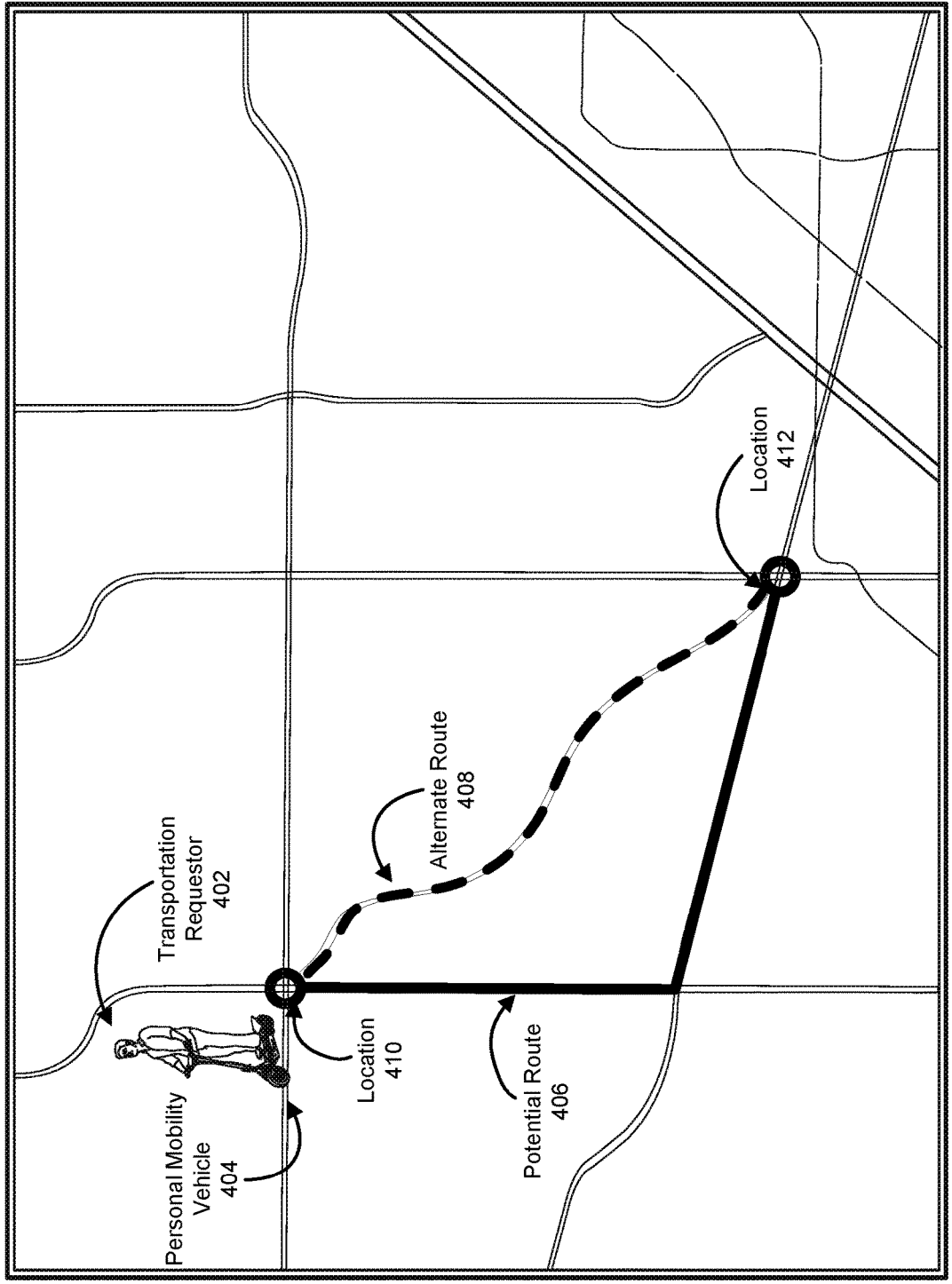
FIG. 4 is an illustration of an example map with a set of potential routes.

FIG. 4 illustrates an example map with a set of potential routes. In some examples, a battery may have sufficient charge to be expected to complete one potential route to a destination but not another. For example, a transportation requestor 402 may be operating a PMV 404 on trip between a location 410 and a location 412. In one example, PMV 404 may be equipped with a battery that has sufficient charge for alternate route 408 but not for potential route 406, which may be longer than alternate route 408. In some examples, potential route 406 may feature a smoother travel surface, fewer turns, fewer hills or elevation changes, or other conditions that may make potential route 406 an equally viable choice to alternate route 408 despite the extra distance. However, in examples where PMV 404 does not have a battery with enough charge to reliably traverse the entirety of potential route 406, the systems described herein may direct transportation requestor 402 to traverse alternate route 408 instead of potential route 406.

In some embodiments, the systems described herein may monitor the battery usage of PMVs traversing different routes. For example, the systems described herein may record the battery charge status at the beginning and end of a route. In some examples, the systems described herein may record battery charge status at time and/or distance intervals, such as every minute, every ten seconds, every mile, and/or every quarter mile. In some embodiments, the systems described herein may use recorded battery usage information to predict battery usage over previously traversed routes (e.g., the routes where the battery usage was recorded) and/or other routes with similar characteristics to the previously traversed routes. For example, the systems described herein may determine that a certain type of PMV (e.g., a scooter) consumes battery charge at a predictable rate when traversing a flat surface at a regular speed, at a higher rate when traveling uphill, and/or a lower rate when traveling downhill. Based on this collected data, the systems described herein may predict the battery consumption of that type of PMV traversing a different route that includes specific amounts of flat surfaces and/or hills.

Figure 5:
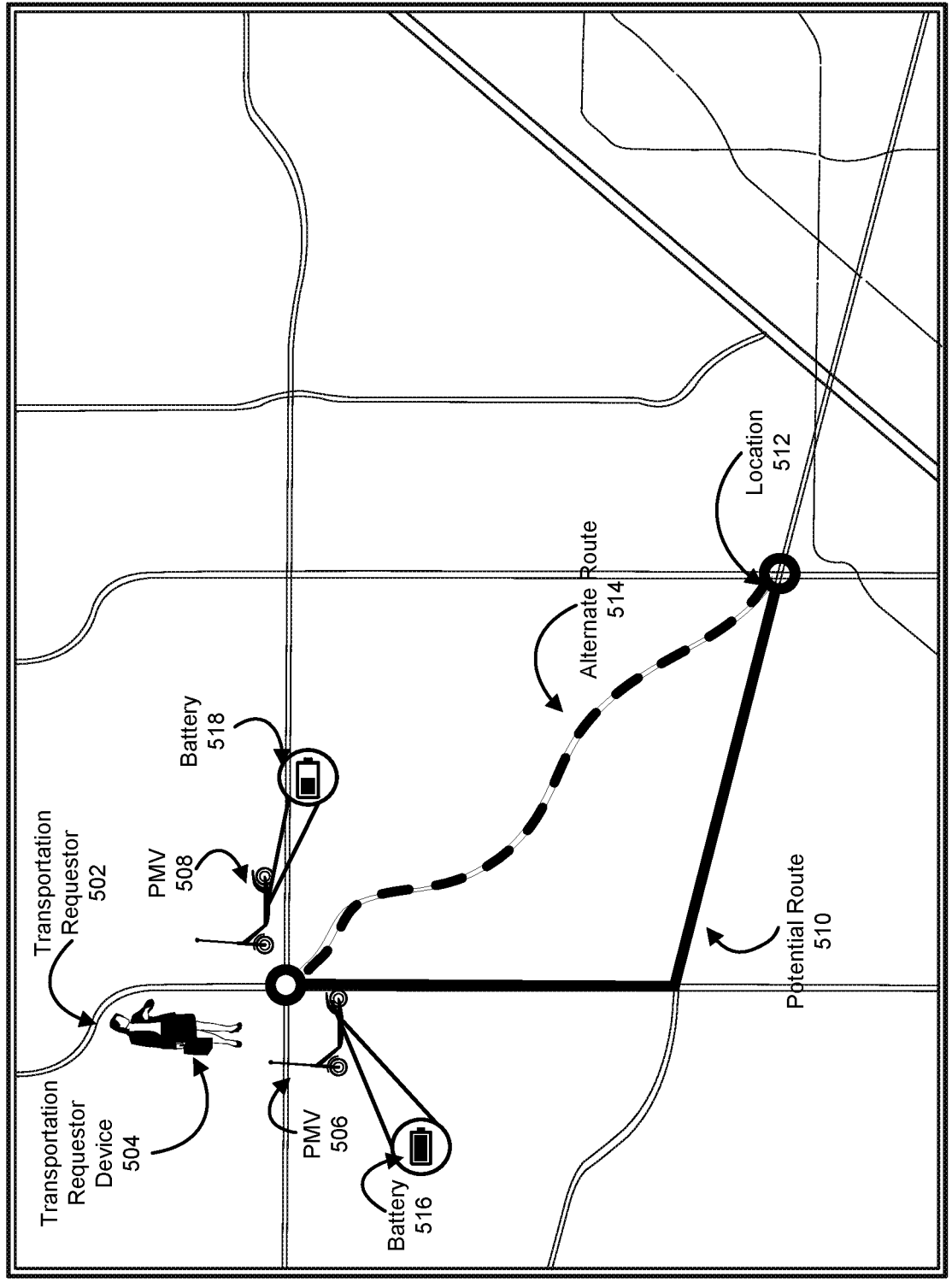
FIG. 5 is an illustration of an example map with a set of personal mobility vehicles with varying battery statuses and locations.

FIG. 5 illustrates an example map with a set of PMVs with varying battery statuses and locations. In one example, a transportation requestor 502 with a transportation requestor device 504 may request transportation to a location 512. In some examples, a PMV 506 with a battery 516 may be available and/or a PMV 508 with a battery 518 may be available. In one example, battery 516 may have more charge than battery 518. In some examples, battery 516 may have sufficient charge for PMV 506 to traverse a potential route 510 or an alternate route 514 to location 512, while battery 518 may only have sufficient charge for PMV 508 to traverse alternate route 514. In one example, the dynamic transportation matching system may match transportation requestor device 504 with PMV 506 and may direct transportation requestor 502 to traverse potential route 510. In another example, the dynamic transportation matching system may match transportation requestor device 504 with PMV 508 and may direct transportation requestor 502 to traverse alternate route 514. In some examples, the dynamic transportation matching system may include the relative distance to transportation requestor device 504 of the different PMVs, the lengths of the routes, the conditions of the routes, the previous charging cycles of the batteries, and/or other relevant factors when determining the matching and/or routing decision for transportation requestor device 504.

Figure 6:
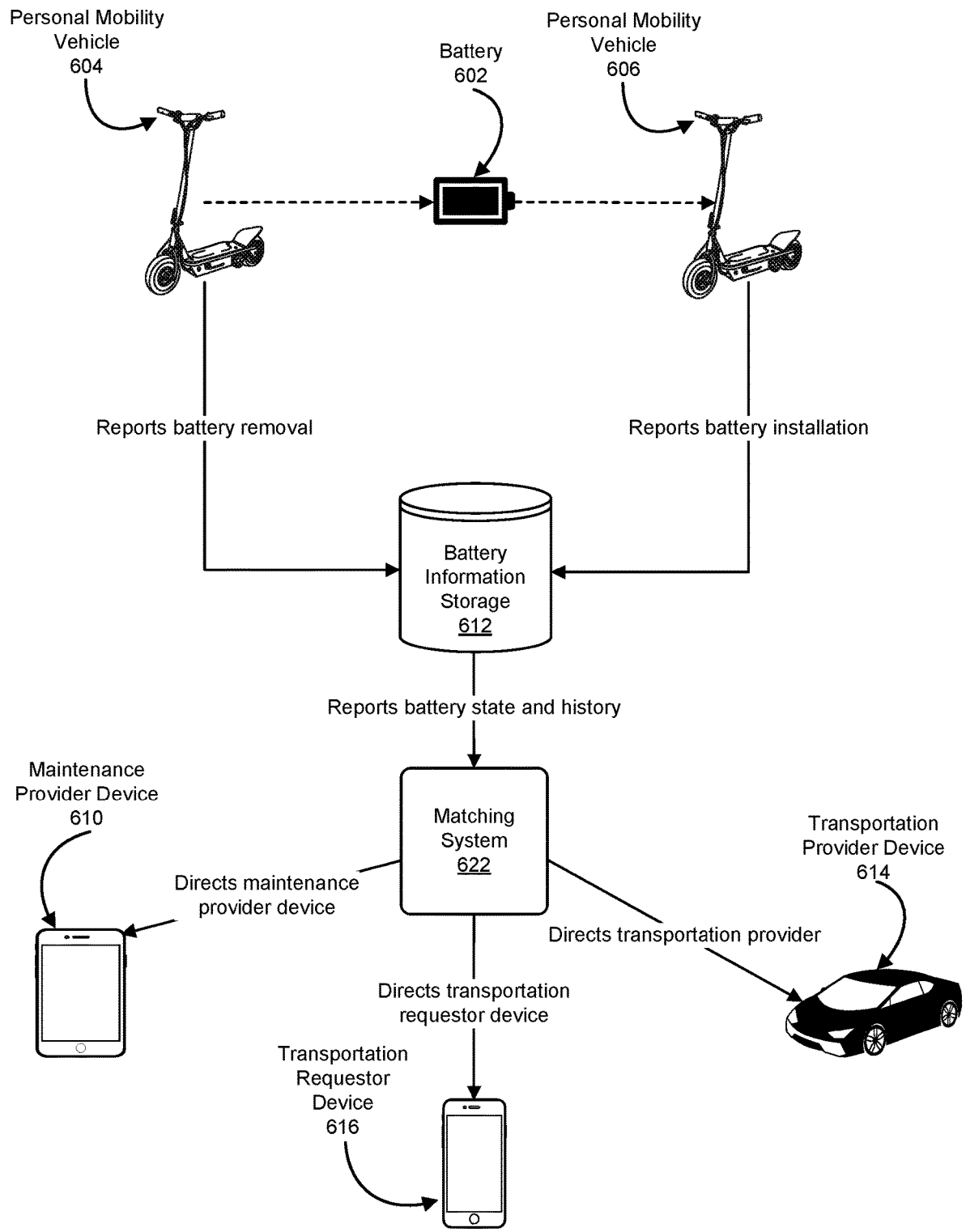
FIG. 6 is a block diagram of an example system for tracking personal mobility vehicle batteries.

FIG. 6 is a block diagram of an example system for tracking PMV batteries. In some examples, a battery 602 may be transferred between a PMV 604 and a PMV 606. For example, battery 602 may be fully discharged and may be removed from PMV 604 to be replaced with a fully charged battery, be charged at a charging station, and then be placed within PMV 606. In one embodiment, PMV 604 and/or battery 602 may report that battery 602 has been removed from PMV 604. In some examples, PMV 606 and/or battery 602 may report that battery 602 has been placed within PMV 606. In one embodiment, the systems described herein may use a unique battery identifier (e.g., a globally unique identifier) in battery information storage 612 to identify battery 602 and/or keep a consistent record of the history of battery 602 across multiple PMVs. In some embodiments, battery information storage 612 may report battery state and/or history to a matching system 622.

In one embodiment, based at least in part on the state and/or history of battery 602, matching system 622 may match a PMV equipped with battery 602 (e.g., PMV 606) with a transportation requestor device 616 to fulfill a transportation request. In some embodiments, the systems described herein may match transportation requestor devices with PMVs that contain batteries in various states based at least in part on transportation requestor device history. For example, the systems described herein may match a transportation requestor device that has a history of short trips with a PMV with a lower battery level to complete a trip even in the absence of a known destination for the current trip. In some embodiments, the systems described herein may determine the average battery charge consumption rate associated with a transportation requestor device. For example, a transportation requestor device may belong to a transportation requestor who accelerates and decelerates abruptly, consuming more battery charge than a transportation requestor who accelerates and decelerates smoothly. In some embodiments, the systems described herein may use the average battery charge consumption of transportation requestors to make determinations about battery and/or PMV matching. For example, the systems described herein may use historical average battery charge consumption to determine whether a battery currently disposed within a particular PMV has sufficient charge to fulfill a transportation request and may make a matching decision for the PMV based on that determination.

Additionally or alternatively, matching system 622 may send a message to a maintenance provider device 610 directing a maintenance provider to provide maintenance to battery 602. For example, battery information storage 612 may report that, based on the recorded history of battery 602, battery 602 will shortly need a specific type of maintenance. In response, matching system 622 may send a message to maintenance provider device 610 directing a maintenance provider to perform that specific type of maintenance. In some examples, matching system 622 may send a message to a transportation provider device 614 directing a transportation provider that is associated with the dynamic transportation network to take an action regarding battery 602. For example, matching system 622 may direct the transportation provider to replace battery 602 with a fully charged battery. In another example, matching system 622 may direct the transportation provider to reposition a PMV equipped with battery 602 to a new location based at least in part on the charge state and/or history of battery 602. For example, if battery 602 is fully charged, matching system 622 may direct the transportation provider to reposition the PMV to a location where a transportation requestor will meet the PMV. In another example, if battery 602 is partially charged, matching system 622 may direct the transportation provider to bring the PMV to meet a transportation requestor whose transportation request can be fulfilled with a partially charged battery. Additionally or alternatively, matching system 622 may direct the transportation provider to bring the PMV to meet a transportation requestor based on battery 602 having experienced fewer charging cycles than the batteries of other nearby and/or available PMVs.

Figure 7:
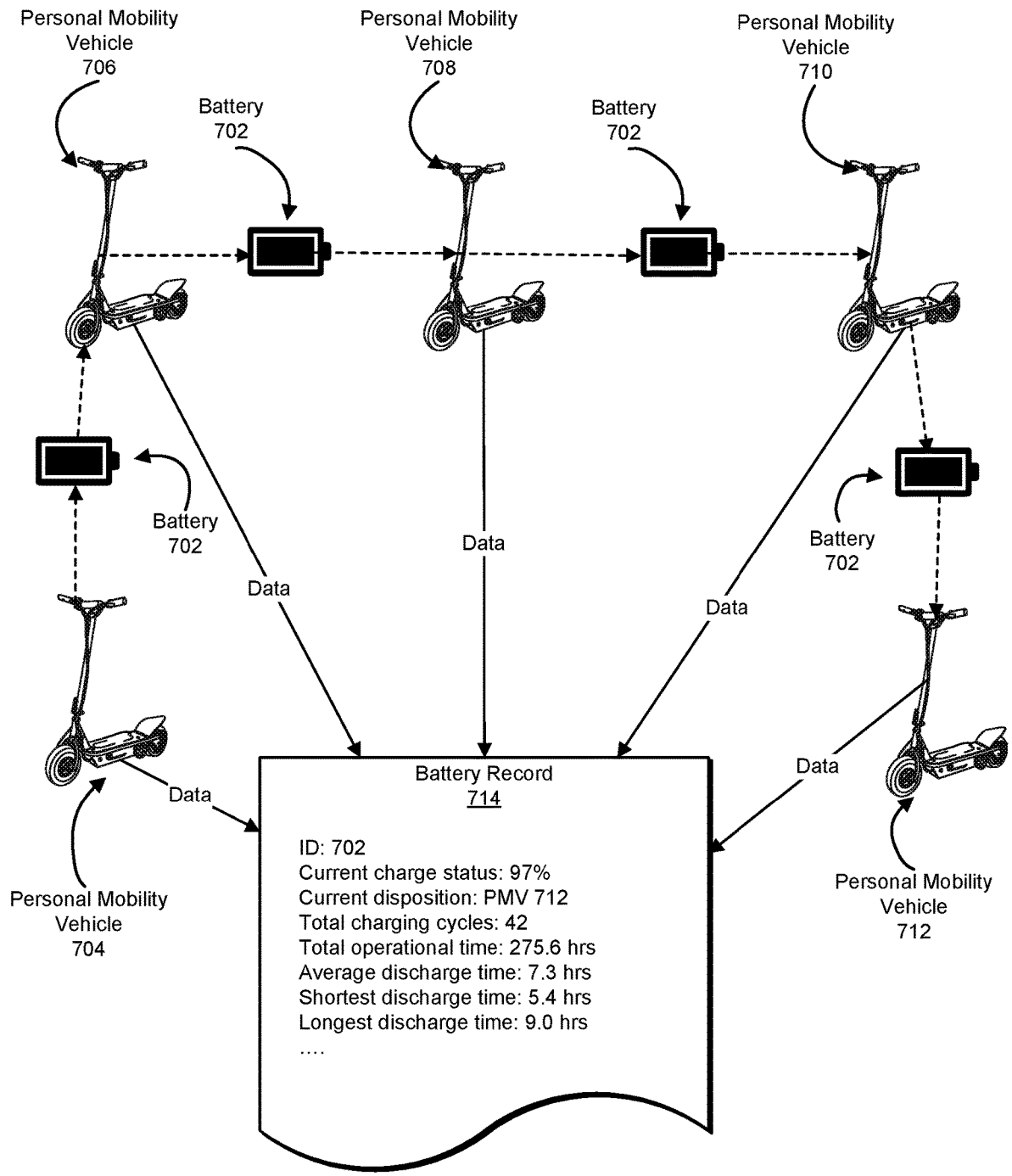
FIG. 7 is an illustration of an example battery record.

FIG. 7 illustrates an example battery record. In some examples, a battery may be deposited in various different PMVs within a dynamic transportation network over a span of time. For example, a battery 702 may be deposited in PMVs 704, 706, 708, 710, and/or 712 at different times. In one embodiment, a battery record 714 may track data for battery 702 across the entire history of battery 702 regardless of PMV. Information tracked by battery record 714 may include, without limitation, an identifier, a current charging status, current disposition, total charging cycles, total operational time, longest discharge time, shortest discharge time, average discharge time, longest distance per charging cycle, shortest distance per charging cycle, average distance per charging cycle, longest charging time, shortest charging time, average charging time, model type, manufacturer, physical dimensions, and/or previous maintenance performed. By tracking battery history across PMVs, the systems described herein may better predict future battery behavior (e.g., the distance a PMV equipped with the battery can travel on the battery's current charge). In some embodiments, by tracking the history and/or state of a battery the systems described herein may determine that a battery has failed, is unreliable, is unsafe, and/or otherwise needs replacement and/or maintenance. In some examples, the systems described herein may extend the lifespan of a battery by matching transportation requestors with a PMV that is equipped with a battery that has experienced fewer charging cycles. Additionally, by tracking the behavior of multiple batteries each disposed within the same PMV, the systems described herein may detect anomalies in PMV battery usage. For example, the systems described herein may detect if a poorly configured PMV is causing batteries to discharge at a higher than normal rate.

Figure 8A:
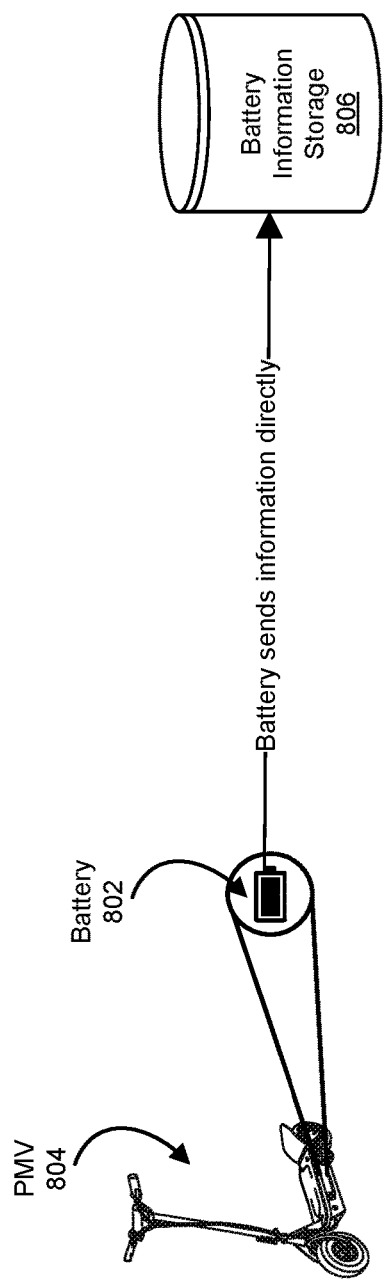
FIGS. 8A and 8B are illustrations of example battery communication configurations.
Figure 8B:
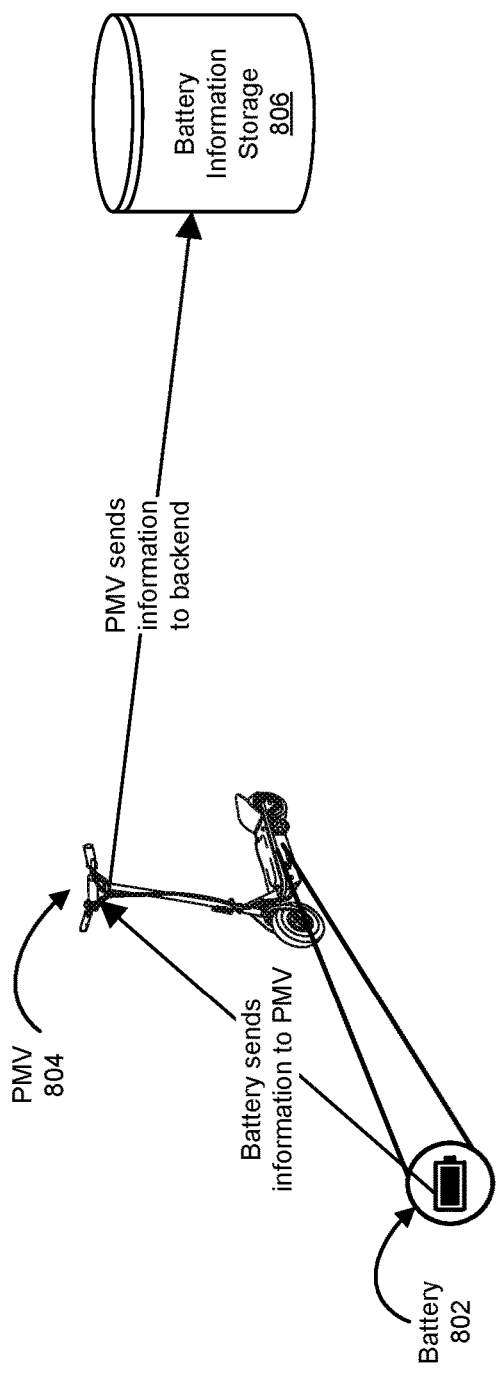

FIGS. 8A and 8B are illustrations of example battery communication configurations. In some embodiments, as illustrated in FIG. 8A, a battery 802 in a PMV 804 may be configured with a communication module and may communicate directly with battery information storage 806. Additionally or alternatively, as illustrated in FIG. 8B, battery 802 may communicate with PMV 804, and PMV 804 may in turn communicate with battery information storage 806. Systems described herein may collect information from battery 802 in any suitable manner. For example, systems described herein may retrieve information from battery 802 via a battery management system that has access to the state of battery 802 and that provides a communication interface for transmitting the state data. In some examples, battery information storage 806 may represent a central data repository (e.g., separate from any individual PMV) that stores battery information collected from multiple PMVs (e.g., PMVs within a transportation network). Battery 802 and/or PMV 804 may communicate with battery information storage 806 in any suitable manner. For example, battery 802 and/or PMV 804 may be equipped with one or more wireless communication devices (e.g., a wireless network adapter, a cellular modem, etc.) that connect with one or more data networks to transmit battery information to battery information storage 806.

Figure 9:
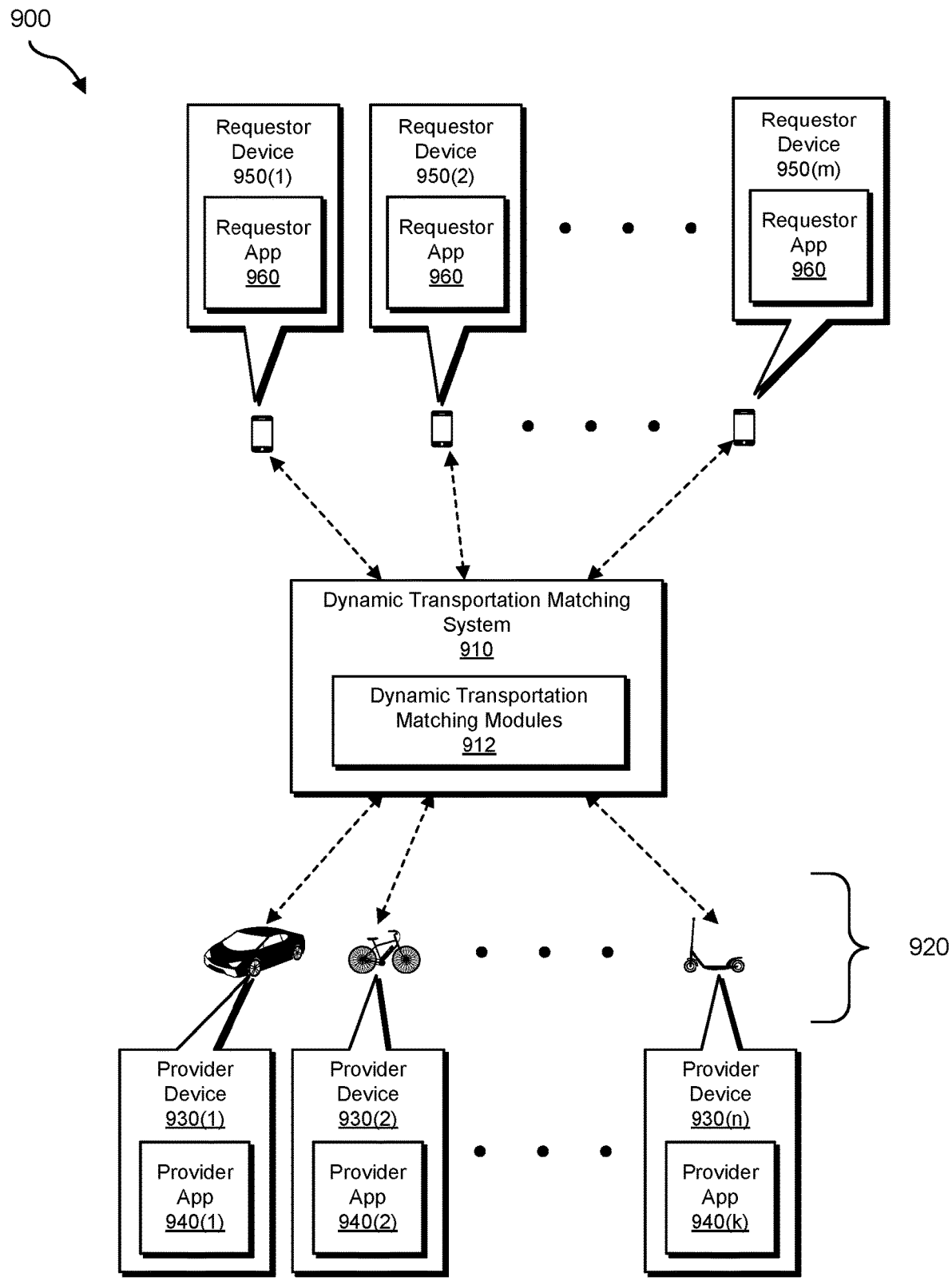
FIG. 9 is a block diagram of an example system for dynamic transportation matching.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include road-going vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 2 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include and/or be provisioned with provider devices 930(1)-(n) (e.g., whether integrated into the vehicle, permanently affixed to the vehicle, temporarily affixed to the vehicle, worn by a driver of the vehicle, etc.). In some examples, provider devices 930 may include provider apps 940(1)-(k). Provider apps 940(1)-(k) may represent any application, program, and/or module that may provide one or more services related to operating a vehicle and/or providing transportation matching services. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider apps 940(1)-(k) may include a transportation matching application for providers and/or one or more applications for matching PMVs with requestor devices. In some examples, provider applications 940(1)-(k) may match the user of provider apps 940(1)-(k) (e.g., a transportation provider) with transportation requestors through communication with dynamic transportation matching system 910. Additionally or alternatively, one or more of provider applications 940(1)-(k) may match a PMV with transportation requestors through communication with dynamic transportation matching system 910. In addition, and as is described in greater detail below, provider apps 940(1)-(k) may provide dynamic transportation management system 910 with information about a provider and/or vehicle (including, e.g., the current location of the provider and/or vehicle) to enable dynamic transportation management system 910 to provide dynamic transportation matching and/or management services for the provider and one or more requestors. In some examples, provider apps 940(1)-(k) may coordinate communications and/or a payment between a requestor and a provider. According to some embodiments, provider apps 940(1)-(k) may provide a map service, a navigation service, a traffic notification service, and/or a geolocation service.

Additionally, as shown in FIG. 9, dynamic transportation matching system 910 may communicate with requestor devices 950(1)-(m). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 10:
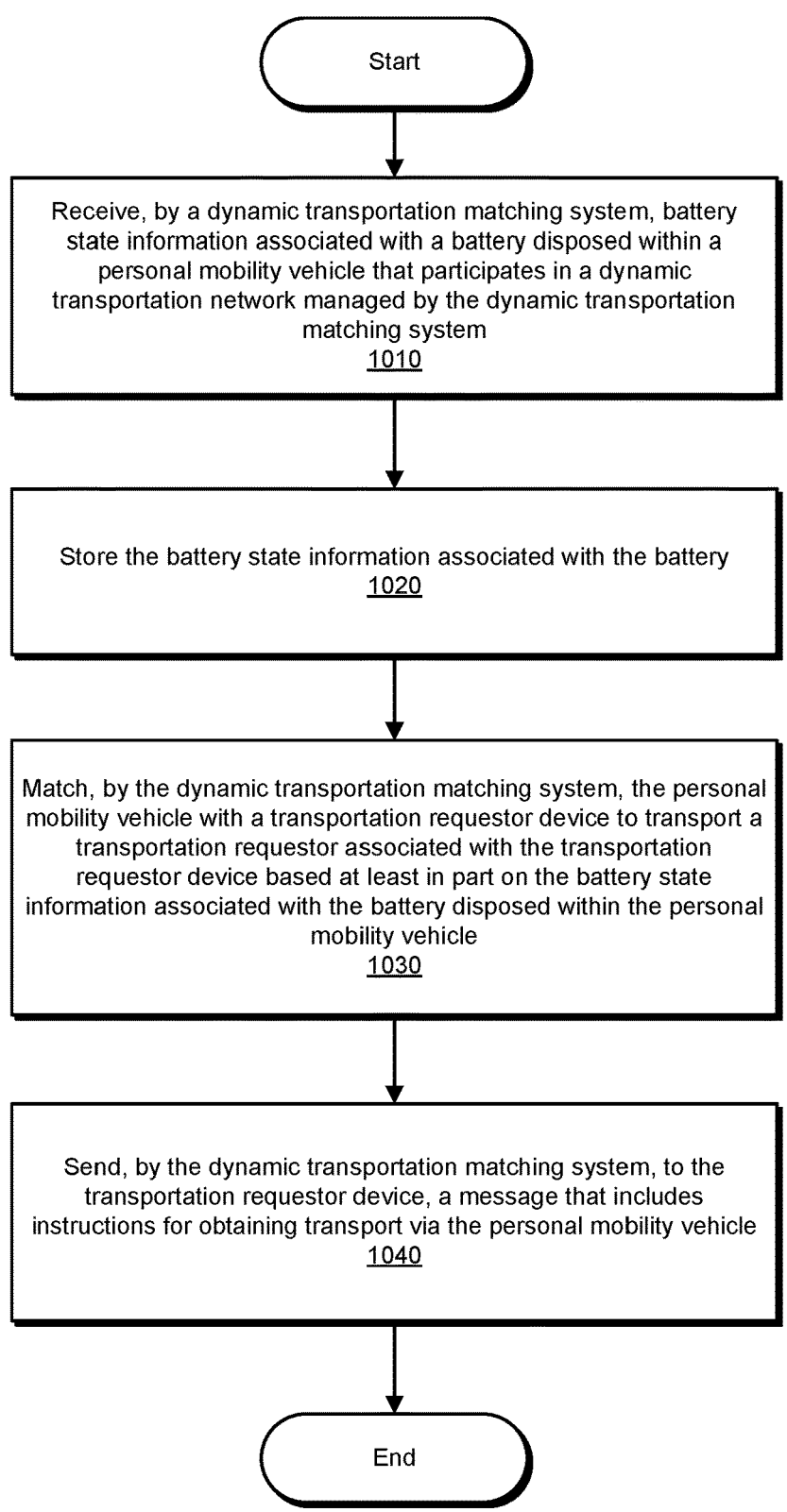
FIG. 10 is a flow diagram of an example method for tracking personal mobility vehicle batteries.

FIG. 10 illustrates an example method 1000 for determining allocation of personal mobility vehicles. As illustrated in FIG. 10, at step 1010, one or more of the systems described herein may receive, by a dynamic transportation matching system, battery state information associated with a battery disposed within a personal mobility vehicle that participates in a dynamic transportation network managed by the dynamic transportation matching system.

In some examples, the dynamic transportation matching system may receive the battery state information by receiving the battery state information via a communication module within the personal mobility vehicle that is physically integrated within the battery and communicatively coupled to the personal mobility vehicle and/or physically integrated within the personal mobility vehicle and communicatively coupled to the battery.

At step 1020, one or more of the systems described herein may store the battery state information associated with the battery. At step 1030, one or more of the systems described herein may match, by the dynamic transportation matching system, the personal mobility vehicle with a transportation requestor device to transport a transportation requestor associated with the transportation requestor device based at least in part on the battery state information associated with the battery disposed within the personal mobility vehicle.

In one embodiment, the dynamic transportation matching system match the personal mobility vehicle with the transportation requestor device by (i) receiving a transportation request from the transportation requestor device, (ii) identifying a first potential route for the personal mobility vehicle to traverse while completing the transportation request, (iii) identifying a second potential route for the personal mobility vehicle to traverse while completing the transportation request, and (iv) selecting the first potential route for completing the transportation request over the second potential route based at least in part on the battery state information.

In one embodiment, the dynamic transportation matching system may match the personal mobility vehicle with a transportation requestor device based at least in part on determining that the battery state information indicates that the battery has sufficient charge for the personal mobility vehicle to fulfill a transportation request received from the transportation requestor device. In one embodiment, the dynamic transportation matching system may match the personal mobility vehicle with the transportation requestor device rather than matching a different personal mobility vehicle with the transportation requestor device based at least in part on determining that the battery state information indicates that the battery has recorded fewer charging cycles than an additional battery that is disposed within the different personal mobility vehicle.

At step 1040, one or more of the systems described herein may send, by the dynamic transportation matching system, to at least one computing device, a message including instructions for performing the battery-dependent action regarding the personal mobility vehicle.

In one embodiment, the dynamic transportation matching system may match an additional mode of transportation with a transportation requestor device rather than matching the personal mobility vehicle with the transportation requestor device based at least in part on determining that the battery state information indicates that the battery has insufficient charge for the personal mobility vehicle to fulfill a transportation request received from the transportation requestor device. In some examples, the dynamic transportation matching system may send, to the transportation requestor device, a message that includes information about using the additional mode of transportation to fulfill the transportation request.

In one embodiment, the dynamic transportation matching system may determine a battery-dependent action by determining, based on the battery state information, that the battery is in an appropriate state for maintenance and may send, to the computing device, the message by sending, based on determining that the battery is in the appropriate state for the maintenance, the message to a maintenance provider device directing a maintenance provider to provide the maintenance. In one embodiment, the dynamic transportation matching system may send, based at least in part on the battery state information, a message to a transportation provider device associated with a transportation provider associated with the dynamic transportation network directing the transportation provider to reposition the personal mobility vehicle and/or replace the battery deposited within the personal mobility vehicle with an additional battery.

In one embodiment, the dynamic transportation matching system may determine that the battery has been transferred from the personal mobility vehicle to an additional personal mobility vehicle and may perform a batter-dependent action based at least in part at least in part on determining that the battery associated with the battery state information is disposed within the additional personal mobility vehicle. In some examples, the dynamic transportation matching system may perform the battery-dependent action based at least in part on determining that the battery associated with the battery state information is disposed within the additional personal mobility vehicle by retrieving historical battery information that was recorded about the battery when the battery was disposed within the personal mobility vehicle.

Figure 11:
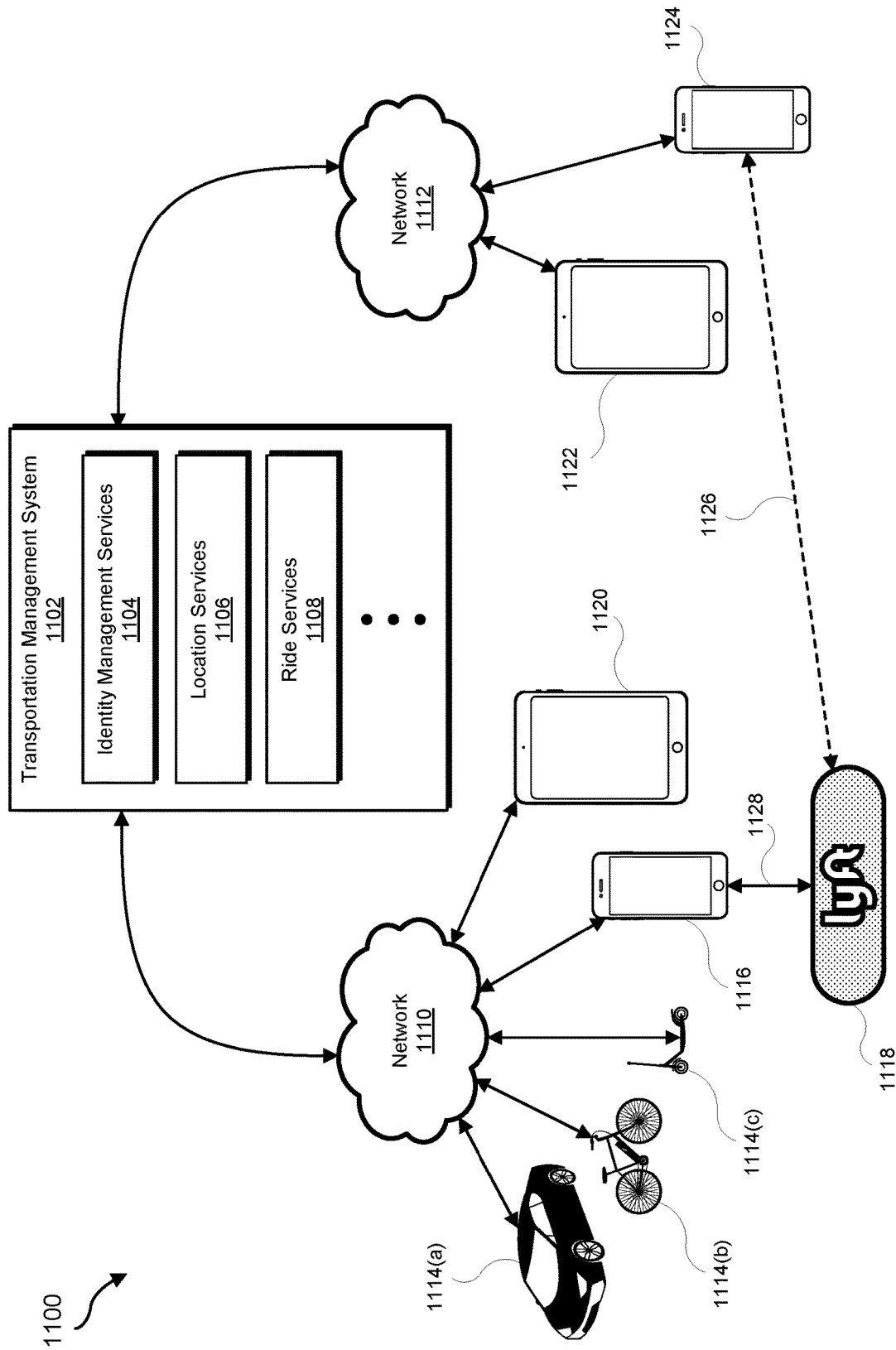
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(*a*), 1114(*b*), and/or 1114(*c*); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.11 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
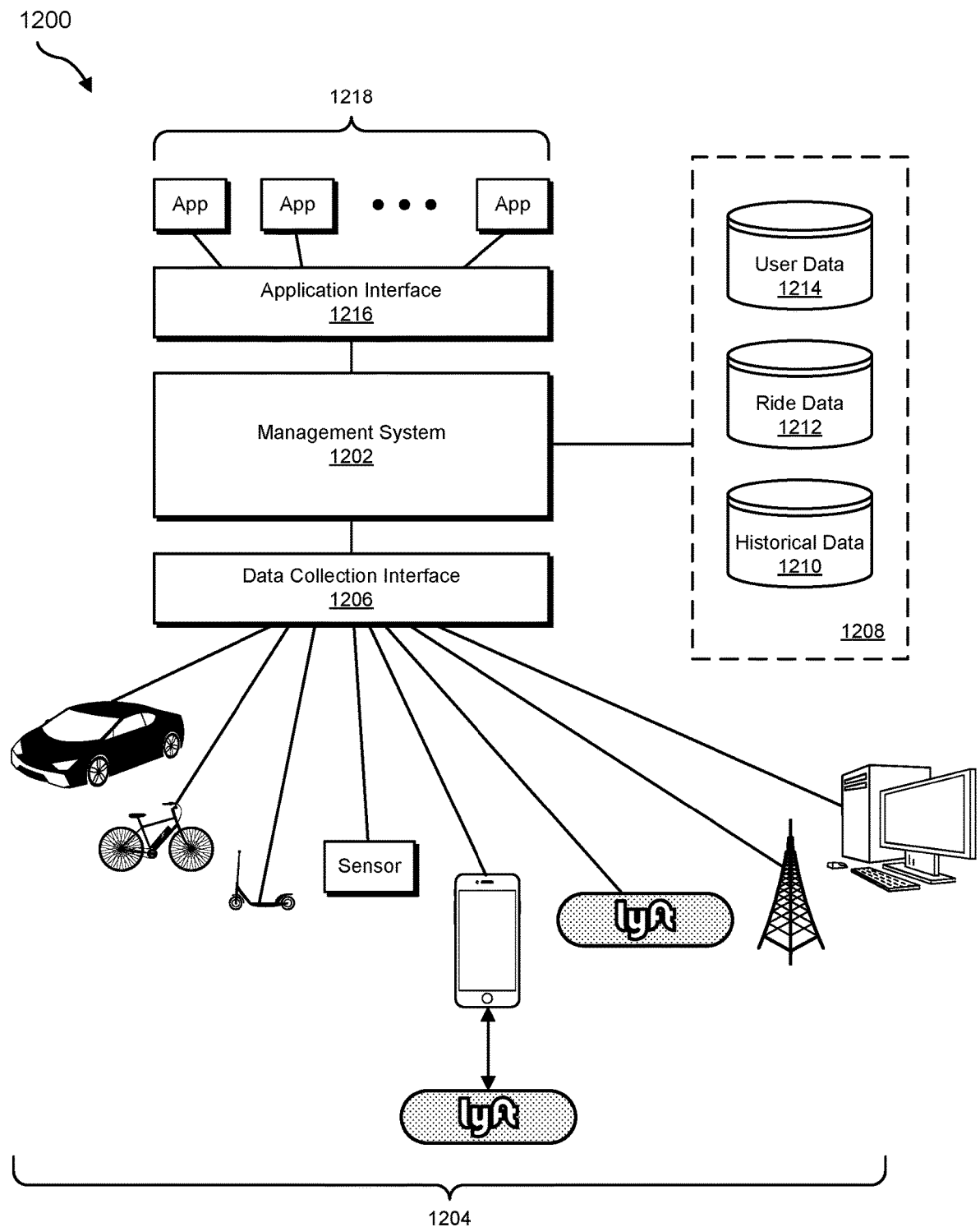
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   determining, by a dynamic transportation matching system, that a battery has been transferred to a personal mobility vehicle managed by the dynamic transportation matching system prior to the personal mobility vehicle being used to begin a transport;
   based at least in part on the determining that the battery has been transferred to the personal mobility vehicle, receiving, by the dynamic transportation matching system, battery state information associated with the battery disposed within the personal mobility vehicle;
   storing, by the dynamic transportation matching system, the battery state information associated with the battery;
   receiving, by the dynamic transportation matching system from a transportation requestor device, a request to begin a transport using one of a plurality of personal mobility vehicles managed by the dynamic transportation matching system, wherein the request comprises a route characteristic;
   predicting, by the dynamic transportation matching system, a battery charge consumption for the transport based on the route characteristic;
   matching, by the dynamic transportation matching system, the personal mobility vehicle with the transportation requestor device based at least in part on the battery state information indicating that a charge of the battery disposed within the personal mobility vehicle meets the predicted battery charge consumption for the transport; and
   sending, by the dynamic transportation matching system, to the transportation requestor device, a message comprising instructions to begin the transport via the personal mobility vehicle.

2. The method of claim 1, wherein the predicting the battery charge consumption for the transport is based further on previous transports facilitated by the dynamic transportation matching system; and
   wherein the matching, by the dynamic transportation matching system, the personal mobility vehicle with the transportation requestor device comprises matching the personal mobility vehicle with the transportation requestor device based at least in part on comparing respective battery state information for batteries disposed in a set of the plurality of personal mobility vehicles, including the personal mobility vehicle.

3. The method of claim 1, wherein matching, by the dynamic transportation matching system, the personal mobility vehicle with the transportation requestor device comprises matching the personal mobility vehicle with the transportation requestor device rather than matching a different personal mobility vehicle with the transportation requestor device based at least in part on determining that the battery state information indicates that the battery has recorded fewer charging cycles than an additional battery that is disposed within the different personal mobility vehicle.

4. The method of claim 1, further comprising:
   receiving a transportation request from an additional transportation requestor device;
   matching an additional mode of transportation with the additional transportation requestor device rather than matching the personal mobility vehicle with the additional transportation requestor device based at least in part on determining that the battery state information indicates that the battery has insufficient charge for the personal mobility vehicle to fulfill the transportation request received from the additional transportation requestor device; and
   sending a new message to the additional transportation requestor device comprising information about using the additional mode of transportation to fulfill the transportation request.

5. The method of claim 1, further comprising:
   determining, based on the battery state information, that the battery is in an appropriate state for maintenance; and
   sending, based on the determining that the battery is in the appropriate state for the maintenance, a message to a maintenance provider device directing a maintenance provider to provide the maintenance.

6. The method of claim 1, wherein the receiving the battery state information comprises receiving the battery state information via a communication module within the personal mobility vehicle that is at least one of:
   physically integrated within the battery and communicatively coupled to the personal mobility vehicle; and
   physically integrated within the personal mobility vehicle and communicatively coupled to the battery.

7. The method of claim 1, further comprising:
   determining, by the dynamic transportation matching system, that the battery has been transferred from the personal mobility vehicle to a second additional personal mobility vehicle; and
   performing, by the dynamic transportation matching system, a battery-dependent action based at least in part on the determining that the battery has been transferred from the personal mobility vehicle to the second additional personal mobility vehicle.

8. The method of claim 1, wherein the battery is transferred to the personal mobility vehicle from an additional personal mobility vehicle, and wherein the method further comprises retrieving historical battery information that was recorded about the battery when the battery was disposed within the additional personal mobility vehicle.

9. The method of claim 1, further comprising sending, by the dynamic transportation matching system, a message to a transportation provider device associated with a transportation provider directing the transportation provider to at least one of:
   reposition the personal mobility vehicle; and
   replace the battery deposited within the personal mobility vehicle with an additional battery.

10. The method of claim 1, wherein the matching, by the dynamic transportation matching system, the personal mobility vehicle with the transportation requestor device comprises:

identifying a first potential route for the personal mobility vehicle to traverse while completing the transport;

identifying a second potential route for the personal mobility vehicle to traverse while completing the transport, wherein the predicting the battery charge consumption for the transport includes predicting a respective battery charge consumption corresponding to the first potential route and the second potential route; and selecting the first potential route for completing the transport over the second potential route based at least in part on the battery state information and the predicted battery charge consumption corresponding to the first potential route being less than the predicted battery charge consumption corresponding to the second potential route.

11. A dynamic transportation matching system comprising:

a non-transitory memory; and one or more hardware processors coupled to the non-transitory memory and configured to execute instructions from the non-transitory memory to cause the dynamic transportation matching system to perform operations comprising:

determining that a battery has been transferred to a personal mobility vehicle managed by the dynamic transportation matching system prior to the personal mobility vehicle being used to begin a transport;

based at least in part on the determining that the battery has been transferred to the personal mobility vehicle, receiving battery state information associated with the battery disposed within the personal mobility vehicle;

storing the battery state information;

receiving, from a transportation requestor device, a request to begin a transport using one of a plurality of personal mobility vehicles managed by the dynamic transportation matching system, wherein the request comprises a route characteristic;

predicting a battery charge consumption for the transport based on the route characteristic;

matching the personal mobility vehicle with the transportation requestor device based at least in part on the battery state information indicating that a charge of the battery disposed within the personal mobility vehicle meets the predicted battery charge consumption for the transport; and sending to the transportation requestor device, a message comprising instructions to begin the transport via the personal mobility vehicle.

12. The dynamic transportation matching system of claim 11, wherein the predicting the battery charge consumption for the transport is based further on previous transports facilitated by the dynamic transportation matching system; and wherein the matching the personal mobility vehicle with the transportation requestor device is based at least in part on comparing respective battery state information for batteries disposed in a set of the plurality of personal mobility vehicles, including the personal mobility vehicle.

13. The dynamic transportation matching system of claim 11, wherein the matching the personal mobility vehicle with the transportation requestor device is performed rather than matching a different personal mobility vehicle with the transportation requestor device based at least in part on determining that the battery state information indicates that the battery has recorded fewer charging cycles than an additional battery that is disposed within the different personal mobility vehicle.

14. The dynamic transportation matching system of claim 11, wherein the operations further comprise:

receiving a transport from an additional transportation requestor device;

matching an additional mode of transportation with the additional transportation requestor device rather than matching the personal mobility vehicle with the additional transportation requestor device based at least in part on determining that the battery state information indicates that the battery has insufficient charge for the personal mobility vehicle to fulfill the transport received from the additional transportation requestor device; and sending to the additional transportation requestor device, a new message comprising instructions for using the additional mode of transportation to fulfill the transport.

15. The dynamic transportation matching system of claim 11, wherein the operations further comprise:

determining based on the battery state information, that the battery is in an appropriate state for maintenance; and based on the determining that the battery is in the appropriate state for the maintenance, sending a message to a maintenance provider device directing a maintenance provider to provide the maintenance.

16. The dynamic transportation matching system of claim 11, wherein the receiving the battery state information comprises receiving the battery state information via a communication module within the personal mobility vehicle that is at least one of:

physically integrated within the battery and communicatively coupled to the personal mobility vehicle; and physically integrated within the personal mobility vehicle and communicatively coupled to the battery.

17. The dynamic transportation matching system of claim 11, wherein the operations further comprise:

determining that the battery has been transferred from the personal mobility vehicle to a second additional personal mobility vehicle managed by the dynamic transportation matching system; and performing a battery-dependent action based at least in part on the determining that the battery associated with the battery state information is disposed within the second additional personal mobility vehicle.

18. The dynamic transportation matching system of claim 11, wherein the battery is transferred to the personal mobility vehicle from an additional personal mobility vehicle managed by the dynamic transportation matching system, and wherein the operations further comprise retrieving historical battery information that was recorded about the battery when the battery was disposed within the additional personal mobility vehicle.

19. The dynamic transportation matching system of claim 11, wherein the operations further comprise sending an additional message to a transportation provider device associated with a transportation provider, the additional message directing the transportation provider to at least one of:

reposition the personal mobility vehicle; and replace the battery deposited within the personal mobility vehicle with an additional battery.

20. A non-transitory computer-readable medium comprising:

computer-readable instructions that, when executed by at least one processor of a computing device, cause the computing device to:
- determine that a battery has been transferred to a personal mobility vehicle managed by the computing device prior to the personal mobility vehicle being used to begin a transport;
- based at least in part on the determination that the battery has been transferred to the personal mobility vehicle, receive battery state information associated with the battery disposed within the personal mobility vehicle;
- store the battery state information associated with the battery;
- receive, from a transportation requestor device, a request to begin a transport using one of a plurality of personal mobility vehicles managed by the computing device, wherein the request comprises a route characteristic;
- predict a battery charge consumption for the transport based on the route characteristic;
- match the personal mobility vehicle with the transportation requestor device based at least in part on the battery state information indicating that a charge of the battery disposed within the personal mobility vehicle meets the predicted battery charge consumption for the transport; and
- send, to the transportation requestor device, a message comprising instructions to begin the transport via the personal mobility vehicle.

* * * * *